United States Patent [19]

Malek

[11] Patent Number: 5,925,456
[45] Date of Patent: Jul. 20, 1999

[54] SELF-ADHESIVE PROTECTIVE FILM

[75] Inventor: Wasfi N. Malek, Hamburg, Germany

[73] Assignee: Beiersdorf AG, Hamburg, Germany

[21] Appl. No.: 08/919,747

[22] Filed: Aug. 28, 1997

[30] Foreign Application Priority Data

Sep. 3, 1996 [DE] Germany .................. 196 35 704

[51] Int. Cl.⁶ ........................................ B32B 27/08
[52] U.S. Cl. ..................... 428/332; 428/192; 428/343; 428/354; 428/355 R; 428/355 EN; 428/500; 428/515
[58] Field of Search .................... 428/343, 352, 428/353, 355 R, 351, 355 RA, 355 EN, 500, 515, 354, 192

[56] References Cited

U.S. PATENT DOCUMENTS

| | | | |
|---|---|---|---|
| 4,713,273 | 12/1987 | Freedman | 428/40 |
| 4,896,943 | 1/1990 | Tolliver et al. | 350/105 |
| 4,917,944 | 4/1990 | Breitscheidel et al. | 428/308.4 |
| 5,189,078 | 2/1993 | Johnson et al. | 523/137 |
| 5,372,669 | 12/1994 | Freedman | 156/243 |
| 5,401,455 | 3/1995 | Hatfield et al. | 264/255 |
| 5,643,676 | 7/1997 | Dobashi et al. | 428/411.1 |
| 5,674,944 | 10/1997 | Falla et al. | 525/239 |
| 5,700,564 | 12/1997 | Freedman | 428/332 |
| 5,750,620 | 5/1998 | Davies et al. | 525/67 |

FOREIGN PATENT DOCUMENTS

| | | | |
|---|---|---|---|
| 0203399 | 12/1986 | European Pat. Off. | B60R 13/00 |
| 0592913A2 | 4/1994 | European Pat. Off. | C09J 7/00 |
| 9533012 | 12/1995 | WIPO | C09J 7/02 |

OTHER PUBLICATIONS

Patent Abstracts of Japan, Abstract of 07216325 (Aug. 15, 1995).
Derwent Abstract of JP 08143838–A (Jun. 4, 1996).
Derwent Abstract of JP 06279742–A (Oct. 4, 1994).

*Primary Examiner*—Paul Thibodeau
*Assistant Examiner*—Sheeba Ahmed
*Attorney, Agent, or Firm*—Sprung Kramer Schaefer & Briscoe

[57] ABSTRACT

Self-adhesive protective film, in particular for cars, characterized in that a self-adhesive composition is applied to a film as support, the film consisting of a mixture of

- 40 parts by weight to 70 parts by weight of polyethylene,
- 20 parts by weight to 40 parts by weight of polypropylene,
- 8 parts by weight to 15 parts by weight of titanium dioxide,
- 0.3 part by weight to 0.7 part by weight of light stabilizers, and the self-adhesive composition consisting of polyethylene vinyl acetate

- having a vinyl acetate content of from 40 mol-% to 80 mol-%, especially 70 mol-%, and
- having a loss angle tan δ of from 0.6 to 1.0, measured at a temperature of 60° C. and a frequency of $10^{-2}$ Hz, and from 0.4 to 0.7, measured at a temperature of 60° C. in a frequency of 10 Hz.

14 Claims, No Drawings

SELF-ADHESIVE PROTECTIVE FILM

DESCRIPTION

Self-adhesive Protective Film

The invention relates to a self-adhesive protective film, preferably for protecting the fresh paint finish of cars and for protecting freshly painted steel strips against soiling and damage during assembly and transportation.

The preservation and protection of motor vehicles in the course of transportation from manufacturer to dealer has long been common practice. It is known that, in order to preserve cars, paraffin waxes are applied in a thickness of from 5 to 20 μm. However, it has been found that, especially on horizontal areas of the vehicles, a layer which is so thin and usually non-uniform does not afford adequate protection against external influences such as, for example, the corrosive action of bird droppings. A considerable disadvantage of sealing with paraffin wax is the need to remove the preservative using a steam jet, surfactants or solvents. Environmentally sound recovery and disposal of the residues are the cause of great complexity in terms of apparatus, and very high costs.

Self-adhesive surface protective films for motor vehicles have also been known for some time. In most cases these are permanently adhesive films for protection and decoration, for example a stone-chip protective film. These self-adhesive films remain permanently on the vehicle following their application.

Reversibly self-adhesive films for protecting the car during transportation have so far been used only in a few isolated cases and without great success.

For instance, in 1977 a self-adhesive film from Beiersdorf AG, consisting of a PVC film with a cross-linked self-adhesive composition of polyacrylate and isocyanate, was used to protect the paint on the front portion of the vehicle against stone chipping and fouling by colliding insects during the running in of the car. However, this film was found to be problematic to use because the polyacrylate composition had to be cross-linked to a very high degree in order not to interact with the vehicle paint. This led to problems in use owing to inadequate bond strength of the film.

Also known are polyacrylate compositions which are not crosslinked. If these polyacrylate compositions are subjected to storage under alternating climatic conditions (for one investigative variant of such conditions see the table in Example 1) they exhibit good compatibility with paint surfaces. On the other hand, however, they are so soft that when the film is peeled off they leave residues of composition on the substrate. As soon as these compositions are chemically or radiation-crosslinked, they can be removed without residue but then give rise to permanent deformations on the paint surface.

Japanese Patent Application JP 02 199 184 discloses a radiation-crosslinkable pressure-sensitive adhesive which for protective use on coats of paint must be formulated with a low glass transition temperature in order to prevent permanent deformations of the paint film. In this case there are problems owing to inadequate bond strength of the self-adhesive film to motor vehicles during transportation and outdoor storage.

European Patent Application EP 0 519 278 discloses, for protecting cars, a film comprising a support coated with a rubber-based pressure-sensitive adhesive having a dynamic modulus of elasticity of from $2 \times 10^5$ to $7 \times 10^6$ dyn/cm² corresponding in Si units to a value of from $2 \times 10^4$ to $70 \times 10^4$ Pa, at 60° C. The adhesive can, moreover, be blended with a silicone oil or with a low molecular mass acrylic polymer. Performance tests with a self-adhesive film of this kind indicate relatively good compatibility with paint surfaces. The bond strength following storage under alternating climatic conditions on paints common in the car industry, however, is so low that the bonding strength required in practice is not always attained. Especially under the influence of moisture on the film, the bond strength is often reduced to such an extent that the film becomes detached during transportation from the vehicle it is protecting, so that there is no longer any protective effect. Furthermore, the self-adhesive composition exhibits no compatibility with the sealing rubber which is common in carmaking; when the protective film is peeled off from window profiles, residues of the adhesive coating composition remain on the rubber.

European Patent Application EP 0 592 913 describes a surface protection film composed of a copolymer of α-(alpha-)olefins and unsaturated, polar comonomers. An additional adhesive coating is not applied in the case of this protection film. Here too, the proposed use is as a surface protection film in connection with the transportation of cars. A film of this kind, while admittedly of simple construction, nevertheless displays distinct disadvantages in its use, especially at high temperatures or under the high mechanical stresses which occur, for example, on the transportation of motor vehicles, covered with the protective film of the invention, on the open vehicle transport wagons of the railways. In such cases, the adhesive force of the protection film proves to be no longer adequate.

The object of the invention was to remedy this situation and, in particular, to provide a self-adhesive protective film from which the disadvantages of the prior art are absent or, if present, then at least not to the same extent.

This object is achieved by a self-adhesive protective film as characterized in more detail in the claims.

The protective film according to the invention comprises a self-adhesive protective film with a film support coated with a self-adhesive composition of polyethylene vinyl acetate having a vinyl acetate content of from 40 mol-% to 80 mol-%, especially 70 mol-%, and a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz. The film itself consists of a mixture of 40 parts by weight to 70 parts by weight of polyethylene, 20 parts by weight to 40 parts by weight of polypropylene, 8 parts by weight to 15 parts by weight of titanium dioxide, 0.3 part by weight to 0.7 part by weight of light stabilizers.

Of the 40 to 70 parts by weight of polyethylene in the film, from 30 to 50 parts by weight are preferably high-impact polyethylene.

The use of the titanium dioxide batch produces increased UV reflection and reduced warming of the protective film under strong solar irradiation. The light stabilizers employed are, in particular, sterically hindered amines.

The film support used has a thickness of from 40 to 100 μm, preferably from 50 to 60 μm. Furthermore, in one preferred embodiment the film is halogen-free.

Between film and self-adhesive composition it is possible for there to have been applied an intermediate coat of polyethylene vinyl acetate having a polyethylene content of from 30 parts by weight to 50 parts by weight and with from 0.3 part by weight to 0.7 part by weight of light stabilizers.

The intermediate coat is preferably halogen-free and is advantageously applied from the melt.

To prepare a particularly advantageous embodiment of the protective film, the film is coextruded in one operation together with the intermediate coat, the thickness of the intermediate coat preferably being approximately 15 μm. The composite of film and intermediate coat prepared in this way has the following physical parameters, as evident from Table 1 which follows.

TABLE 1

Physical parameters of the film/intermediate coat composite

| | |
|---|---|
| Overall thickness of film + intermediate coat | 65 μm |
| Overall weight of film + intermediate coat | 63 g/m² |
| Tensile strength, lengthwise | ≧30 N/mm² |
| Tensile strength, transverse | ≧20 N/mm² |
| Extension, lengthwise | ≧450 % |
| Extension, transverse | ≧450 % |
| Impact strength under tension, lengthwise | ≧3000 mJ/mm² |
| Impact strength under tension, transverse | ≧400 mJ/mm² |

The protective film has a thickness of from 50 to 200 μm, preferably from 65 to 80 μm.

In order to optimize the properties the self-adhesive composition employed can be blended with one or more additives such as rosin esters, hydrocarbon resins, paraffin oils or anti-ageing agents, and can additionally be halogen-free.

For self-adhesive protective films it is possible to use different adhesive compositions. Most of these, however, have grave disadvantages which severely restrict their use.

A decisive parameter in developing a self-adhesive system which meets the conditions linked with the use of such protective films is the rheological behaviour of the compounded self-adhesive system. For instance, the glass transition point, identified by a tan δ maximum, should be at temperatures from −5° C. to −25° C. and at the maximum should adopt almost frequency-constant values of up to 1.0 at most. This ensures excellent repositionability on the basis of a very low initial adhesive force. At temperatures above 10° C. to 30° C., preferably 20° C., tan δ is required to rise as a function of temperature. Thus at 60° C. tan δ at $10^{-2}$ Hz should be not less than 0.6 before dropping at 10 Hz to not less than 0.4. This ensures the marked rise in bonding strength within just the first 30 minutes after bonding.

Known nonpolar self-adhesive compositions, comprising polyacrylate and polyurethane, show better paint compatibility than polar compositions in a test in which, having been applied to painted metal panels, they are subjected to storage under alternating climatic conditions. On the other hand, however, they are too soft and leave residues of composition when the film is peeled off. If the compositions are chemically or radiation-crosslinked, they lead to unwanted paint-film deformation.

Self-adhesive compositions based on natural rubber resin can be peeled off without residue and with only very slight paint-film deformation. However, such compositions are not stable to ageing under the effect of UV radiation. This is particularly evident under extreme stresses over a prolonged period (six months), as occur, for example, in Florida.

A polyisobutylene self-adhesive composition with a loss modulus G" of G"=1.29×10⁶ dyn/cm², corresponding in Si units to a value of G"=12.9×10⁴ Pa, and with a loss angle tan δ of 0.2 (both values measured at a temperature of 60° C. and at a frequency of 1 Hz) shows only very slight paint-film deformations. However, the peel force from the paint surface following storage under alternating climatic conditions is very low and therefore not in accordance with the utility.

Unforeseeably to the person skilled in the art, a self-adhesive composition comprising polyethylene vinyl acetate with a vinyl acetate content of from 40 mol-% to 80 mol-%, and specially 70 mol-%, and with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz, has the properties sought. The self-adhesive composition can be applied to the film from solution or from the melt.

On the one hand, the self-adhesive composition has a good bond strength to various stoving enamels common in the automotive industry, even under the influence of moisture or humidity, so that the protective film is not detached from the vehicle even under the action of wind; on the other hand, its very low initial adhesive force makes it reversibly adhesive, so that it is possible during application to correct the position of the protective film on the vehicle. In addition to this, the self-adhesive composition shows a distinct rise in bonding strength even with low initial adhesive force and within the first 30 minutes after bonding, so that after only half an hour the protective film can be exposed, for example, to severe airstream stress (up to 160 km/h). In addition, the self-adhesive composition of the invention ensures a very low unrolling force.

In particular, on a 50 μm thick film which consists of the mixture indicated in claim 1 and has an intermediate coat of polyethylene vinyl acetate with a polyethylene component, the self-adhesive composition according to the invention does not give rise to any paint-film deformation on metal panels coated with polyurethane paint and dried at 130° C. for 30 minutes and after storage under alternating climatic conditions as set out in more detail in Example 1 of this description.

The peel force of the protective film according to the invention from various substrates is from 2 to 5 N/cm, which meets the requirements of practice.

In addition, irradiation of the protective film with UV light, for example with a 300 W uV lamp with a sunlight spectrum over 5 days, leads to no detectable impairment in the properties of the protective film. There is no embrittlement, and neither does the self-adhesive composition cause paint-film deformation or paint discoloration nor do residues of composition occur when the protective film is peeled off.

The protective film according to the invention is therefore particularly suitable for protecting, during assembly or transportation, the fresh paint finish of cars or, during machining and transportation, freshly painted steel strips. In this context bonding with the protective film can be carried out just half an hour after the painted surfaces have passed through the oven, without any disadvantages whatsoever despite the fact that, at this point in time, the paint is not yet fully cured. Furthermore, when used as an edge-securing tape for the additional fastening of self-adhesive masking film of large surface area, the protective film shows outstanding properties.

In addition to this, the protective film according to the invention is notable in that it can be applied in a large width over the bonnet, roof and boot of the car and, owing to its flexibility, adapts very well to planar and gently rounded surfaces. It is thereby possible to protect the horizontal surfaces which are most at risk from soiling. However, narrow areas such as, for example, the projection of the door below the windows can easily be covered over. Protection of the vertical surfaces on the vehicle is particularly appropriate during its assembly.

The protective film is resistant to sunlight, moisture, heat and cold, weathering stability being provided for up to six months.

In particular, the novel blending of the support film with a titanium dioxide batch and with light stabilizers leads to an improvement in the UV resistance of the protective film, which was unexpected for the skilled worker. Even very high rates of solar irradiation, as are commonplace in Florida, for example, do not lead to failure or dissolution of the protective film, at least not over a period of six months.

After application of the protective film and following storage for 14 days at changing temperatures and under the effect of weathering (see Example 1), the self-adhesive composition does not give rise to any deformation of the underlying paint film. In addition, the uniform overall thickness of the protective film ensures, in comparison to preservation with wax, flawless protection against soiling and damage of the whole vehicle.

Following use, the protective film can be peeled off without residue, and without tearing the support film, in spite of the required, good bond strength. Even on sealing rubbers as widely used in the case of cars, there are no residues of composition after peeling.

Since the protective film is halogen-free, recycling thereof or energy recovery therefrom is readily possible.

In the text which follows the invention will be illustrated on the basis of examples which are not, however, intended unnecessarily to restrict the invention.

EXAMPLES

Example 1

A self-adhesive composition comprising a polyethylene vinyl acetate mixture consisting of 40 parts by weight of polyethylene vinyl acetate with a vinyl acetate content of 45 mol-% and a melt index of $\leq 5$ g/10 min (190° C., 2.16 Kp) and 60 parts by weight of polyethylene vinyl acetate having a vinyl acetate content of 70 mol-% and a melt index of $\leq 5$ g/10 min (190° C./2.16 Kp), having a loss angle tan δ of 0.65–0.41 at a frequency of 0.1–10 Hz, measured at a temperature of 60° C., is dissolved in toluene to give a 20% strength solution which is applied at a rate of 15 g/m² to the intermediate-coating side of a 1450 mm wide coextruded composite in a coating unit having a spreader bar and a drying tunnel. The composite is composed of a 50 μm thick film consisting of 60 parts by weight of polyethylene, of which 40 parts by weight are high-impact polyethylene, 30 parts by weight of polypropylene, 10 parts by weight of $TiO_2$ batch and 0.5 part by weight of light stabilizers and of an intermediate coating with a thickness of 15 μm, consisting of 60 parts by weight of polyethylene vinyl acetate and 40 parts by weight of polyethylene.

The drying temperature is 80° C. with a residence time of 3 minutes. At the end of the tunnel the coated support web is cut at the edges into long rolls with a length of 200 m and a width of 1400 mm.

The self-adhesive film produced in this way can be unrolled easily and without creases and can be applied flawlessly when used to protect cars. Because of the good tack and improved correctability, the bonding processes can be speeded up. After use, the self-adhesive film can be peeled off again without defects after a bonding period of up to six months.

The protective film features the physical properties given in the table below.

| | |
|---|---|
| Overall thickness of protective film: | 80 μm |
| Peel force from 2-component PU finish after 14 days of alternating climatic conditions (as indicated below) at a peel angle of 180° and a peel rate of 300 mm/min: | 3.5 N/cm |
| Peel force from the reverse at a peel angle of 180° and a peel rate of 300 mm/min: | 0.06 N/cm |

The alternating climatic conditions comprise the following cycles:

| Cycle 1 | | Cycle 2 | |
|---|---|---|---|
| Duration [h] | Temperature [°C.] | Duration [d] | Temperature [°C.] |
| 4 | 80 | 3 | 90 |
| 4 | −30 | plus 4 times cycle 1 | |
| 16 | 40 at 100% rel. humidity | | |

Cycle 2 is repeated a total of 2 times.

Example 2

A self-adhesive composition comprising 70 parts by weight of polyethylene vinyl acetate having a vinyl acetate content of 40 mol-% and a melt index of 25 g/10 min (190° C./2.16 Kp) and comprising 30 parts by weight of rosin ester with a softening point of 85° C., having a loss angle tan δ of 1.15–0.75 at a frequency of 0.1–10 Hz, measured at a temperature of 60° C., is dissolved in toluene to give a 20% strength solution which is applied at a rate of 28 g/m² to a film as in Example 1 in a coating unit for self-adhesive tapes with spreader bar and drying tunnel, and is dried at 80° C. with a residence time of 4 minutes. At the end of the tunnel the coated support web is cut up into rolls with a length of 66 m and a width of 38 mm.

The rolls of self-adhesive tape produced in this way can be used as edge-securing tape for the additional fastening of self-adhesive masking film of large surface area for cars. They are notable in that despite a relatively high adhesive force they are highly compatible with the car finishes.

The protective film features the physical properties given in the table below.

| | |
|---|---|
| Overall thickness of protective film: | 93 μm |
| Peel force from 2-component PU finish after 14 days of alternating climatic conditions (as indicated below) at a peel angle of 180° and a peel rate of 300 mm/min: | 5 N/cm |
| Peel force from the reverse at a peel angle of 180° and a peel rate of 300 mm/min: | 2.6 N/cm |

The alternating climatic conditions comprise the following cycles:

| Cycle 1 | | Cycle 2 | |
| --- | --- | --- | --- |
| Duration [h] | Temperature [°C.] | Duration [d] | Temperature [°C.] |
| 4 | 80 | 3 | 90 |
| 4 | −30 | plus 4 times cycle 1 | |
| 16 | 40 at 100% rel. humidity | | |

Cycle 2 is repeated a total of 2 times.

Example 3

A self-adhesive composition comprising a polyethylene vinyl acetate mixture consisting of 40 parts by weight of polyethylene vinyl acetate having a vinyl acetate content of 45 mol-% and a melt index of ≦5 g/10 min (190° C./2.16 Kp) and 60 parts by weight of polyethylene vinyl acetate having a vinyl acetate content of 70 mol-% and a melt index of ≦5 g/10 min (190° C./2.16 Kp), having a loss angle tan δ of 0.65–0.41 at a frequency of 0.1–10 Hz, measured at a temperature of 60° C., is prepared in an overall thickness of 79 μm in a width of 1500 mm in an extrusion unit, applied with 14 g/m² in a three-ply laminate.

The laminate is composed of a 50 μm thick film, consisting of 60 parts by weight of polyethylene, of which 40 parts by weight are high-impact polyethylene, 30 parts by weight of polypropylene, 10 parts by weight of TiO₂ batch and 0.5 part by weight of light stabilizer, and of an intermediate coat with a thickness of 15 μm, consisting of 65 parts by weight of polyethylene vinyl acetate and 35 parts by weight of polyethylene.

The composite produced in this way, comprising film, intermediate coat and self-adhesive composition, can be employed as in Example 1 for protecting large areas of cars.

The self-adhesive film is notable for the fact that it is produced from the melt with complete freedom from solvents.

The protective film features the physical properties given in the table below.

| | |
| --- | --- |
| Overall thickness of protective film: | 79 μm |
| Peel force from 2-component PU finish after 14 days of alternating climatic conditions (as indicated below) at a peel angle of 180° and a peel rate of 300 mm/min: | 3.1 N/cm |
| Peel force from the reverse at a peel angle of 180° and a peel rate of 300 mm/min: | 0.05 N/cm |

The alternating climatic conditions comprise the following cycles:

| Cycle 1 | | Cycle 2 | |
| --- | --- | --- | --- |
| Duration [h] | Temperature [°C.] | Duration [d] | Temperature [°C.] |
| 4 | 80 | 3 | 90 |
| 4 | −30 | plus 4 times cycle 1 | |
| 16 | 40 at 100% rel. humidity | | |

Cycle 2 is repeated a total of 2 times.

The rheological measurements were carried out in each case under constant-deformation conditions using an instrument from the company Rheometric Scientific.

I claim:

1. Self-adhesive protective film, comprising a self-adhesive composition applied to a film as support, the film consisting of a mixture of 40 parts by weight to 70 parts by weight of polyethylene, 20 parts by weight to 40 parts by weight of polypropylene, 8 parts by weight to 15 parts by weight of titanium dioxide, 0.3 part by weight to 0.7 part by weight of light stabilizers, and the self-adhesive composition comprising polyethylene vinyl acetate having a vinyl acetate content of from 40 mol -% to 80 mol-%, and having a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz.

2. Self-adhesive protective film according to claim 1, wherein an intermediate coat of polyethylene vinyl acetate is applied to the film, having a polyethylene content of from 30 parts by weight to 50 parts by weight, and from 0.3 part by weight to 0.7 part by weight of light stabilizers.

3. Self-adhesive protective film according to claim 2, wherein the intermediate coat is halogen-free.

4. Self-adhesive protective film according to claim 2, wherein the intermediate coat is applied from the melt.

5. Self-adhesive protective film according to claim 1, wherein the protective film has a thickness of from 50 to 200 μm.

6. Self-adhesive protective film according to claim 1, wherein, of the 40 to 70 parts by weight of polyethylene in the film from 30 to 50 parts by weight are high-impact polyethylene.

7. Self-adhesive protective film according to claim 1, wherein the film has a thickness of from 40 to 100 μm.

8. Self-adhesive protective film according to claim 1, wherein the film is halogen-free.

9. Self-adhesive protective film according to claim 1, wherein the self-adhesive composition is blended with one or more additives selected from the group consisting of rosin esters, hydrocarbon resins, paraffin oils and anti-ageing agents.

10. Self-adhesive protective film according to claim 1, wherein the self-adhesive composition is halogen-free.

11. Self-adhesive protective film according to claim 1, wherein the self-adhesive composition is applied from solution.

12. Self-adhesive protective film according to claim 1, wherein the self-adhesive composition is applied from the melt.

13. A method of protecting painted surfaces of cars or steel strips during assembly and transportation, which comprises applying a protective film of claim 1 to said painted surfaces.

14. A method for securing the edges of self-adhesive masking film which comprises applying a protective film of claim 1 to said edges.

* * * * *